UNITED STATES PATENT OFFICE.

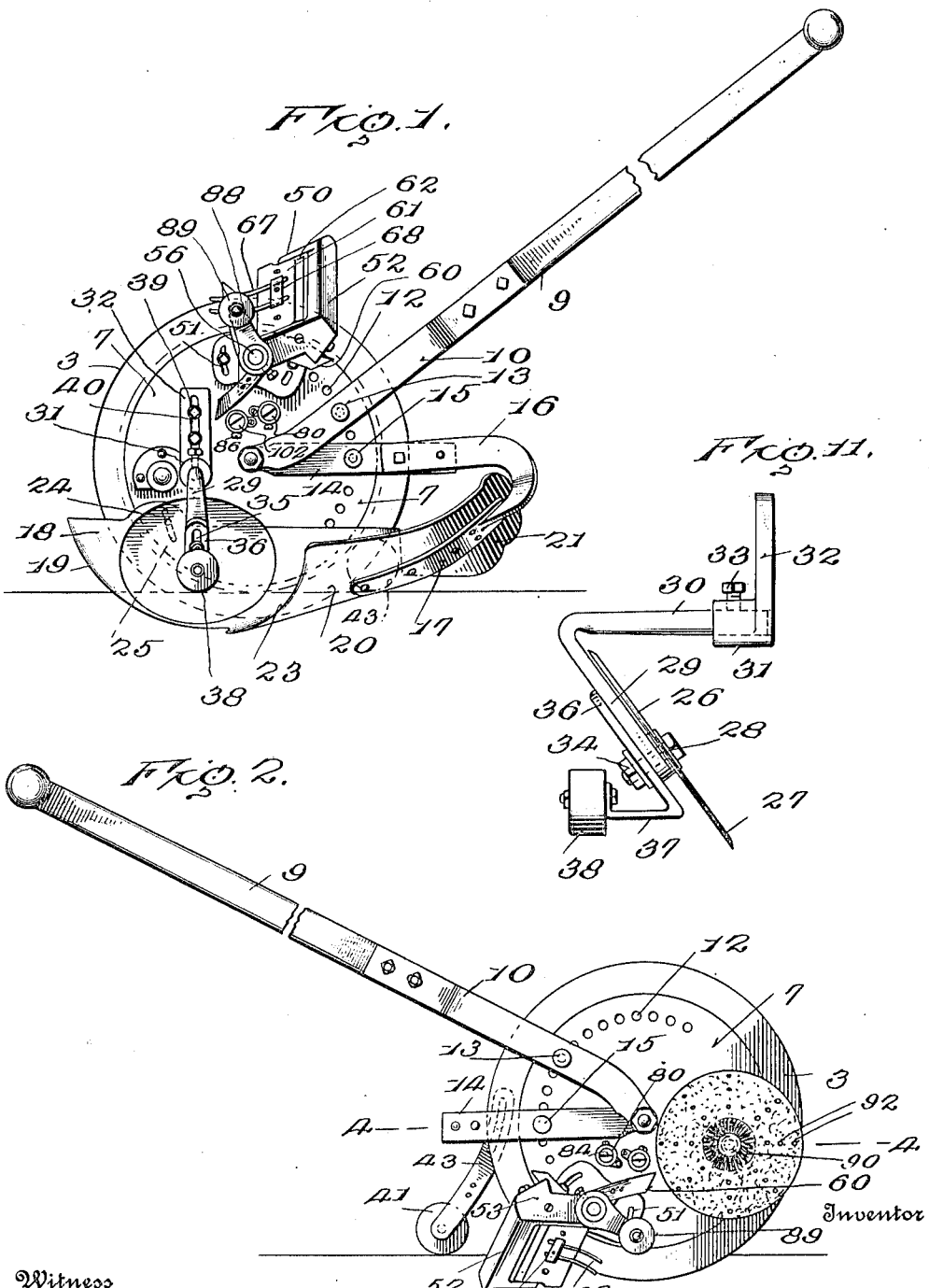

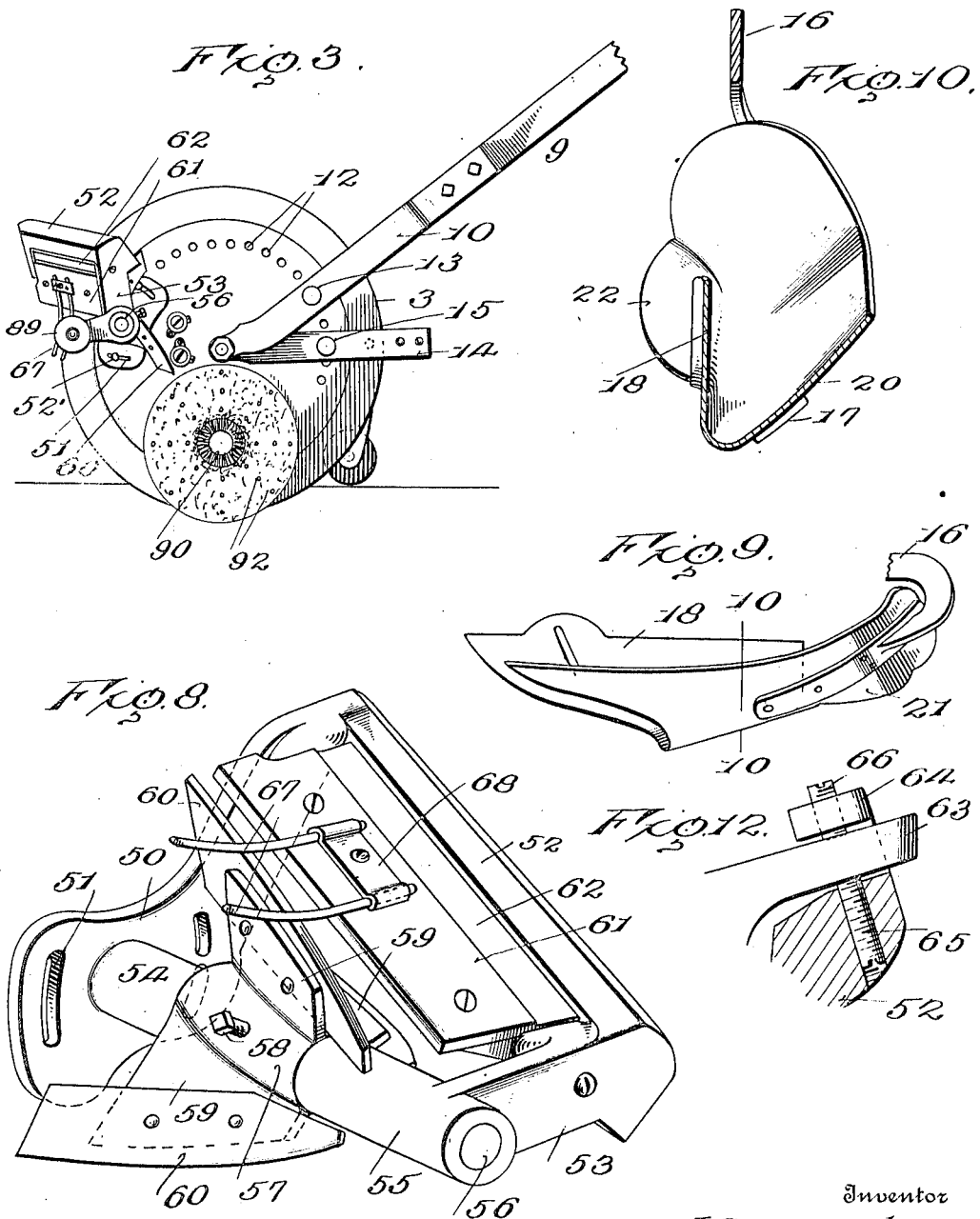

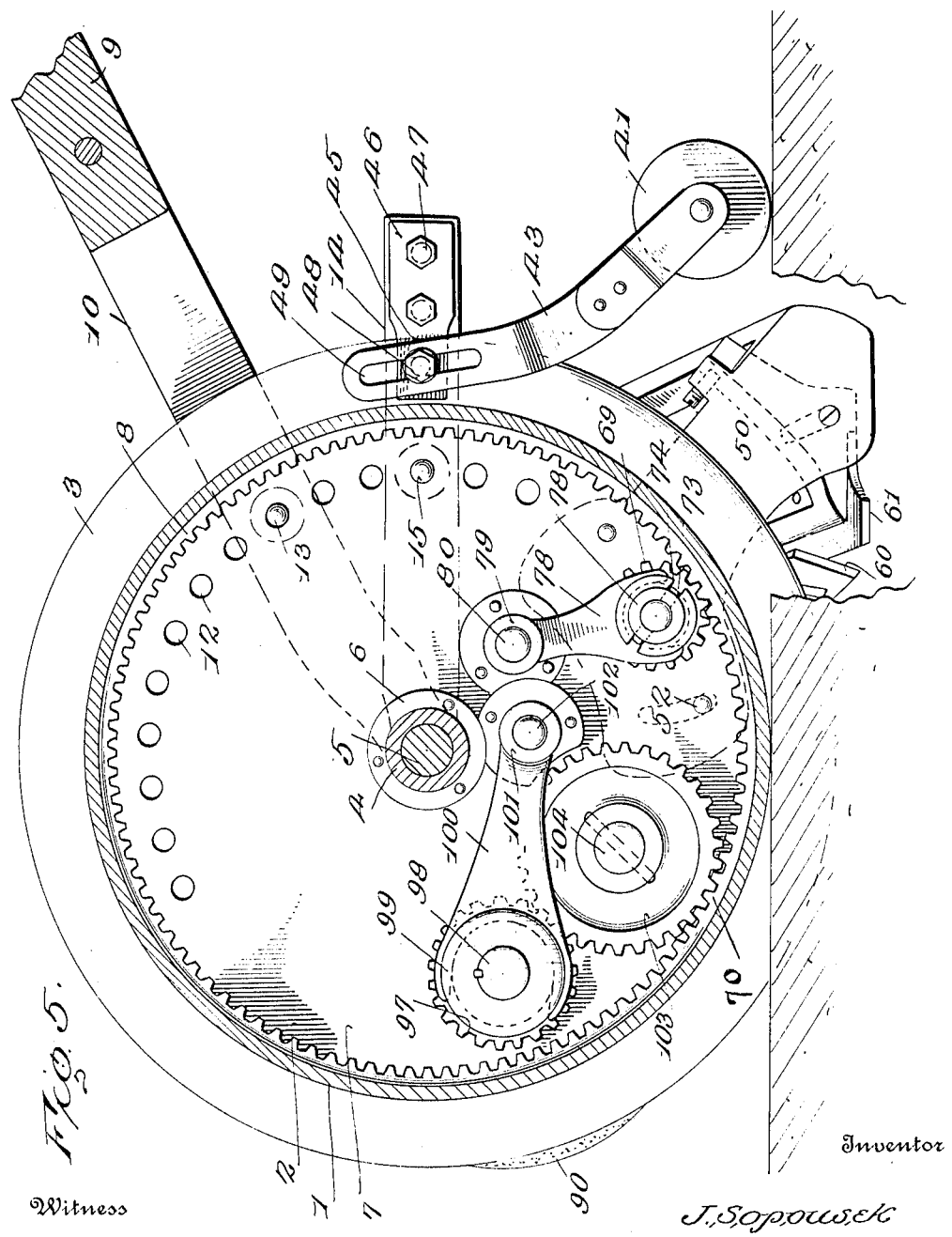

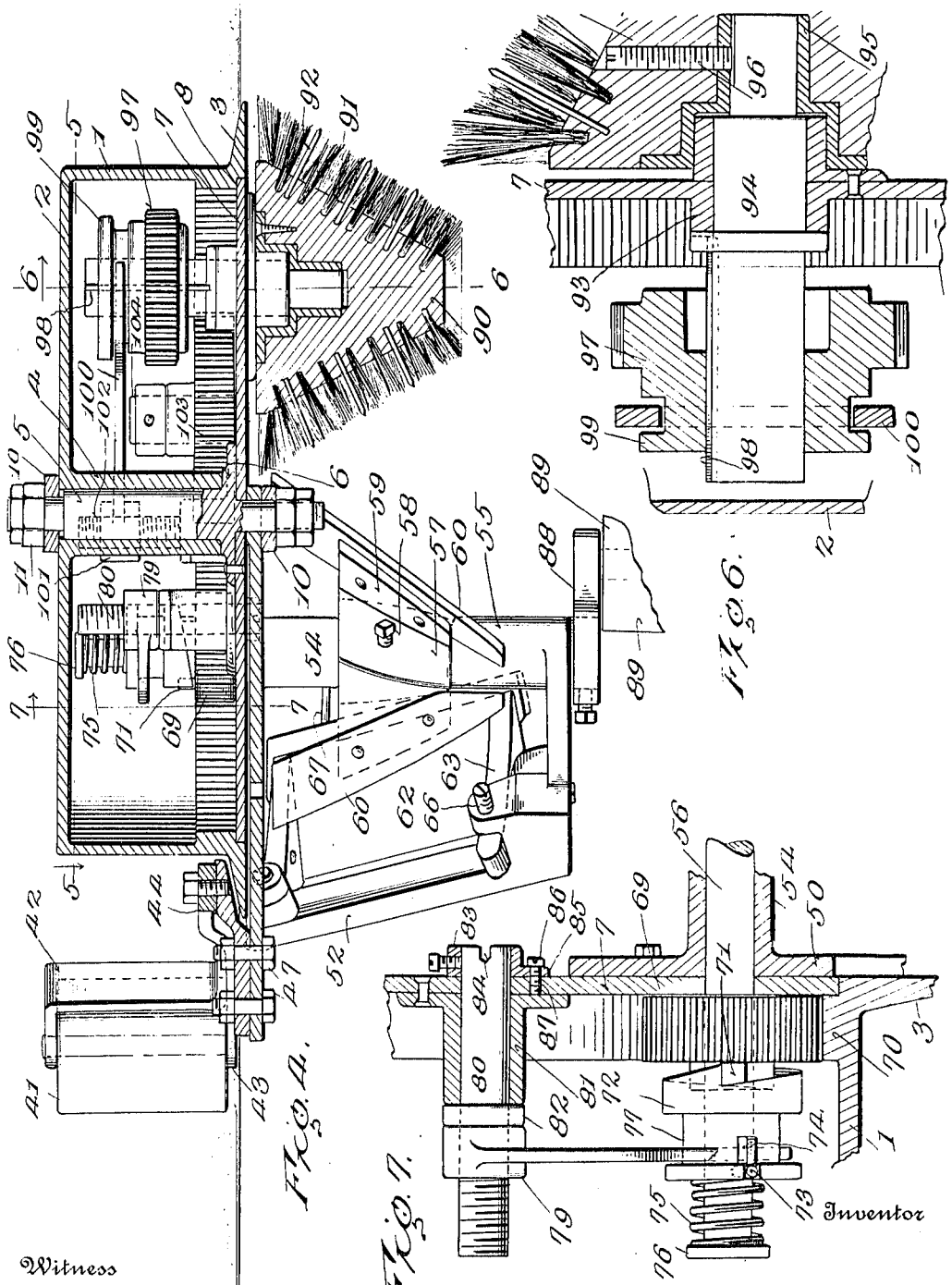

JOSEPH SOPOUSEK, OF CEDAR RAPIDS, IOWA.

COMBINATION LAWN-EDGE TRIMMER.

1,313,866.

Specification of Letters Patent.     Patented Aug. 19, 1919.

Application filed May 7, 1917. Serial No. 166,917.

*To all whom it may concern:*

Be it known that I, JOSEPH SOPOUSEK, a citizen of the United States, residing at Cedar Rapids, in the county of Linn and State of Iowa, have invented certain new and useful Improvements in Combination Lawn-Edge Trimmers, of which the following is a specification.

This invention has as its object to provide a machine which may be employed in trenching and trimming the edges of lawns so as to greatly improve the appearance thereof.

More specifically, the invention aims to provide a machine which may be employed, first, in the digging of the trench in the sod at the edge of the walk and, subsequently, in trimming the grass growing in the trench and removing the cut grass or any leaves or other debris which may accumulate in the trench.

The invention also has as its object to provide a machine so constructed as to be capable of performing the several functions above stated by a simple readjustment of the parts so that with the single machine the edge of a lawn may be at all times kept in proper and attractive condition without incurring, however, the labor incident to the use of spades and other hand implements as is now customary.

The invention further aims to so construct the machine that a trench of any desired depth, within reason, may be dug thereby and the grass trimming and trench clearing devices adjusted in accordance with the depth of the trench.

In the accompanying drawings:

Figure 1 is a side elevation of the machine adapted for use in the digging of a trench;

Fig. 2 is a similar view illustrating the machine adapted for use in the trimming of grass growing in the trench;

Fig. 3 is a similar view illustrating the machine adapted for use in clearing the trench of the cut grass, leaves, and other debris;

Fig. 4 is a horizontal sectional view on the line 4—4 of Fig. 2;

Fig. 5 is a vertical sectional view on the line 5—5 of Fig. 4;

Fig. 6 is a vertical transverse sectional view on the line 6—6 of Fig. 4;

Fig. 7 is a similar view taken substantially on the line 7—7 of Fig. 4;

Fig. 8 is a perspective view of the grass trimming device detached from the machine and viewing the underside thereof;

Fig. 9 is a perspective view illustrating a modified form of trenching plow;

Fig. 10 is a vertical transverse sectional view on the line 10—10 of Fig. 9;

Fig. 11 is a view in front elevation of the trenching disk and its mounting detached from the machine;

Fig. 12 is a detail vertical sectional view through a portion of the cutter mechanism.

The machine embodying the present invention includes a ground wheel from which the grass trimming and trench clearing devices are driven, said devices, as also the trenching plow and disk, being supported upon a plate, which is relatively stationary. The said ground wheel includes a peripheral or tread portion, indicated by the numeral 1, which portion is integral with a head 2 and is provided with an annular flange 3 designed to travel along the edge of the walk over which the wheel is caused to run when the machine is propelled in a forward direction. It will be observed that the head 2 is located at one side of the tread of the wheel and that the flange 3 is located at the opposite side thereof, the wheel as a whole being hollow so as to house the gearing for driving the grass trimming and trench clearing devices. The head 2 is formed axially with a hollow hub, indicated by the numeral 4, and within this hub rotatably fits a spindle 5 which, at one end, is provided with an integral attaching flange 6 secured to the plate heretofore mentioned, which plate is indicated by the numeral 7 and comprises the other head of the wheel, being disposed in position to close the open side of the hollow wheel and with its periphery resting in an annular rabbet 8 formed in the inner side of the tread of the said wheel. The machine is adapted to be propelled by means of a handle similar to the ordinary lawn-mower handle and indicated by the numeral 9, and the said handle having secured to its forward end the two members 10 of a yoke which straddles the wheel and which members thereof receive the ends of the spindle 5, nuts 11 being fitted to the ends of the spindle for the purpose of holding the members 10 assembled therewith and also for the purpose of holding the plate 7 in proper position with relation to the ground wheel. The plate 7 is formed with a substantially semi-circular series of threaded openings 12, which series is concentric to the axis of the plate, and a set screw 13 is fitted through an opening in that one of the members 10 next adjacent said plate and is adapted to be selectively threaded into the said openings 12 for the purpose of connecting the plate and handle 9 in proper relative positions to adapt the machine for the performance of its several functions, it being understood that the plate is also in this manner held fixed with relation to the handle so that the devices supported by the plate for digging the trench, trimming the grass, and clearing the trench, may be held fixed in proper position when brought into action.

As the machine is first employed in the formation of the trench, the trench forming plow and disk will first be described. The numeral 14 indicates a supporting arm, which, at its forward end, is pivotally fitted to that end of the spindle 5 which extends through the plate 7 and the said supporting arm carries a set screw 15 which, as in the case of the set screw 13, is designed to be selectively threaded into the openings 12. The trenching plow is supported by a standard 16 which is secured at its forward end to the rear end of the arm 14, it being observed that the said arm 14 extends rearwardly beyond the periphery of the ground wheel. The standard 16 is suitably curved and has an attaching portion 17 which is secured to the underside of the said trenching plow. The plow is preferably in the nature of an integral blade comprising a landside 18 having a downwardly and rearwardly curved forward edge 19 which is sharpened so as to readily cut through the soil. The landside 18 is disposed in a vertical plane beside the ground wheel and is designed to cut through the sod close to the edge of the walk along which the machine is moved. Integral with the rear portion of the landside 18 is the mold board, indicated by the numeral 20, and the said mold board is inclined laterally and upwardly from the landside and has its rear portion curved rearwardly and laterally in the opposite direction, or, in other words, toward the ground wheel, as indicated by the numeral 21, so as to deposit the sod on to the walk as it is removed in the act of forming a trench. In order that the sod may be with certainty deposited upon the walk, the mold board 21 extends laterally beyond the plane of the adjacent side of the ground wheel so as to overlie the walk as the machine is advanced along the said walk, this extension being indicated by the numeral 22. The forward edge of the portion 20 of the mold board is also sharpened, as indicated by the numeral 23, so as to pass readily through the sod.

The forward portion of the plow is supported by means of a set screw 24 which is fitted through a slot 25 in the landside 18 and threaded into the plate 7. As heretofore stated a disk is employed in connection with the trenching plow just described and this disk is designed to cut through the sod at an inclination so that the trench will be approximately V-shape, the wall of the trench next adjacent the walk being vertical and the opposite wall being inclined with relation thereto. The disk above referred to is indicated by the numeral 26 and is of flat circular form, being provided with a sharp peripheral cutting edge 27 adapting it to readily pass through the sod. The disk is mounted for free rotation upon a spindle 28 which is fitted through an opening in an arm 29 which is provided at its upper end with a shank 30 fitted into a socket 31 at the lower end of an attaching plate 32. The shank 30 is held in the socket 31 by means of a set screw 33. The spindle 28 is in the nature of a bolt having a nut 34 fitted upon one end which end of the bolt passes through a slot 35 formed in an attaching plate 36 having a laterally extending arm 37 at its lower end supporting a roller 38. Bolts 39 are fitted through a slot 40 formed in the attaching plate 32 and are threaded into the plate 7, it being understood that in this manner the disk is mounted upon the said plate beside the landside 18 of the trenching plow. By reference to Fig. 11 of the drawings it will be observed that the arm 29 is inclined downwardly and inwardly from its shank 30 and that this inclination corresponds to the inclination of the disk 26. It will also be understood by reference to this figure and to Fig. 1 that the lower side of the disk travels relatively close to the cutting edge 19 of the landside. It will also be observed by reference to the said figures that the roller 38 is supported for rotation about a horizontal axis and is located outwardly of the disk 26. This roller 38 is designed to travel upon the sod beyond the trench being formed as the machine is caused to travel along the walk. As the machine so travels the trenching plow and disk cut through the sod, thereby forming the V-shaped trench above referred to. If desired the rear end of the plow may be raised until the edge 23 of the mold board clears the sod and the forward end of the plow can be lowered so as to cause the edge 19 of the landside to cut deeply into the sod. The machine may then be moved along the walk, the landside of the trenching plow making a vertical incision in the sod beside the edge of the walk and the disk 26 making an inclined incision, but no sod being actually removed. The rear end of the plow may then be lowered to the position shown in Fig. 1 of the drawings and the disk may be elevated and the machine again moved along the walk for the purpose of removing the sod between the two incisions. On the other hand, if the sod is in good workable condition the machine may be operated with the plow and disk in the position shown in Fig. 1 of the drawings. In order to steady the machine as it is caused to travel along the walk there is provided a roller 41 mounted in a yoke 42 at the lower end of an arm 43. This arm has one side roughened or serrated, as indicated by the numeral 44, and disposed against the serrated face 45 of a plate 46, which plate is bolted or otherwise secured, as at 47, to the inner face of the rearwardly projecting end of the arm 14. A bolt 48 is fitted through a slot 49 in the upper end of the arm 43 and is threaded into an opening formed in the serrated portion of the plate 46, adjustment of the arm 43 being in this manner provided for so that the arm may be raised or lowered to correspondingly adjust the roller 41. This roller is designed to travel over the surface of the walk immediately adjacent the edge of the walk, as clearly shown in Fig. 4 of the drawings.

Fig. 2 of the drawings illustrates the machine adapted for use in trimming the grass which grows in the trench and when so adapted the trenching plow and disk which coacts therewith are removed and the machine is propelled in a reverse direction, as will be evident by reference to the said figure of the drawings. The mower device includes a frame having an attaching portion 50 formed with oppositely located arcuate slots 51 through which are passed set screws 52' which are threaded into the plate 7 and which serve to hold said frame in adjusted position upon the plate. The frame includes a head 52 which extends laterally, upwardly, and forwardly from the rear end of the said attaching plate 50, and a portion 53 which extends forwardly from the outer end of the said head. The plate 50 is provided between the openings 51 with a shaft bearing 54 which is in alinement with a shaft bearing 55 at the rear end of the frame member 53. A shaft 56 is journaled for rotation in the bearings 54 and 55 and has fixed upon its portion which lies between the adjacent ends of the said bearings, the hub of a cutter, indicated by the numeral 57, the hub being secured upon the shaft by means of a set screw 58. The hub is formed with radially and spirally extending flanges 59 which support sickle blades 60. The blades are so supported that the cutting edges thereof, in the rotation of the cutter, will describe substantially a conical surface, the larger end of the cutter as a whole being the end which is located next adjacent the plate 7. The fixed blade of the cutter is indicated by the numeral 61 and the same is secured in any suitable manner upon a plate 62 provided at its opposite ends with shank portions 63 which are fitted between the upper side of the head 52 and lugs 64, set screws 65 and 66 being threaded respectively through the head 52 and lugs 64 to bear against the upper and under sides of the said shank portions. The cutting edges of the blades 60, in the rotation of the shaft 66, of course, coacts with the cutting edge of the blade 61 in the same manner as in an ordinary lawn mower, and it will be understood that the blade 62 carried in the fixed blade 61 may be adjusted through the medium of the screws 65 and 66 so as to properly position the cutting edge of the blade 61 with relation to the cutting edges of the blades 60. In order to lift the fallen blades of grass, lifting fingers 67 are attached to the underside of the fixed blade 61 by means of a clip 68 and project forwardly beyond the cutting edge of the said blade. In order that rotary motion may be imparted to the shaft 56 and the mower device thus operated, a pinion 69 is loosely mounted upon the shaft 56 immediately inwardly of the plate 7 and meshes with an internal gear 70 upon the inner side of the tread portion of the ground wheel. The inner face of the gear 69 carries clutch teeth 71 which are designed to be engaged by the shoulders of a clutch member 72 which is slidably fitted upon the shaft 56 and which is held for rotation with the said shaft by the engagement of a pin 73 carried by said shaft, in a notch 74 formed in the said clutch member. A spring 75 tends to move the clutch member in the direction of the pinion 69 and the said spring is mounted upon the shaft 56 and bears at one end against the inner end of the clutch member 72 and at its other end against a head 76 fixed upon the inner end of the shaft 56. The clutch member 72 is reduced in diameter between its ends, as at 77, and engaging the reduced portion of the said clutch member is a yoke 78. This yoke is provided at one end with a collar 79 which is interiorly threaded and which is fitted to the threaded inner end of an adjusting key 80, the said key being rotatably fitted in a bearing 81 upon the inner face of the plate 7 adjacent the shaft 56. A collar 82 is integral with or fixed upon the rotatable key 80 and bears at the inner end of the bearing 81, and a collar 83 is fitted on the outer end of the key and engages the outer face of the plate 7, it being understood that these collars prevent longitudinal displacement of the key, and that when the key is rotated the collar 79 will be fed toward or away from the collar 82, correspondingly moving the clutch member 72 with relation to the pinion 69. In order that the key may be rotated, in its outer end it is formed with a transverse notch 84 in which may be engaged the bit of a screw driver. If found desirable the collar 83 may be provided with an ear 85 through which is fitted a set screw 86 designed to enter a threaded opening 87 in the plate 7 so as to prevent rotation of the collar after the key has been adjusted. It will be apparent that by adjusting the key the clutch member 72 may be adjusted into and out of operative relation to the clutch teeth 71. Also the shaft 56 may rotate backwardly without actuating the mower mechanism driven thereby due to the fact that the reduced portion of the clutch member 72 is of a width greater than the thickness of the yoke which coacts therewith. In order that the machine may be steadied when in operation for the purpose of trimming the grass growing in the trench, an arm 88 is adjustably secured upon the outer end of the bearing 55 and supports a roller 89, it being understood that the said arm may be adjusted angularly with relation to the frame in which the cutter of the mower device is mounted so as to correspond to the depth to which the mower device is to enter the trench. This roller 89, of course, travels upon the sod adjacent the trench.

Fig. 3 of the drawings illustrates the machine as adapted for use in clearing the trench of cut grass, leaves, and other debris and it will be observed by reference to said figure that this means is in the nature of a rotary brush. Said brush comprises a frusto-conical head 90, the surface of which is provided with tufts of relatively stiff bristles 91, there being wire bristles 92 which may be arranged in rows or in any other suitable manner interspersed with the bristles 91. Rotatably mounted in a suitable bearing 93 upon the plate 7 is a shaft 94, the outer end of which projects beyond the plane of the said plate 7 and is reduced and fits a bushing 95 mounted in the major end of the head 90, a set screw 96 being threaded radially through the said head and bearing against the end of the said shaft whereby to secure the head in place thereon. The inner end of the shaft has mounted upon it a pinion 97 which is held upon the shaft by means of a key 98 and is, therefore, rotatable with the shaft although slidable thereon and by reason of such sliding movement the pinion may be brought into and out of mesh with the internal gear 70. The said pinion 97 is provided with a grooved collar extension 99 engaged by the arms of a yoke 100 and this yoke, as in the case of the yoke 78, is provided with a threaded collar 101 which fits the threaded end of an adjusting key 102 which corresponds to the key 80. A gear 103 is loosely mounted upon a stub shaft 104 and this gear meshes at all times with the internal gear 70. By adjusting the key 102 the pinion 97 may be moved into and out of mesh with the said gear 103 and it will be understood that when in mesh with the said gear the pinion 97 will be rotated and rapid rotary motion will be imparted to the brush. Due to the shape of the brush the same is adapted to effectually act upon the inclined wall of the trench to clear the same of cut grass and the like.

If desired, a trenching plow of the form shown in Fig. 9 of the drawings may be employed instead of the plow first described it being understood that in the modified structure it is unnecessary to also employ the disk.

Having thus described the invention, what is claimed as new is:

1. A machine of the class described embodying trench forming, mowing, and trench clearing devices, and means whereby said devices may be selectively operated.

2. A machine of the class described embodying independent trench forming and trench mowing devices, and means whereby said devices may be selectively operated.

3. A machine of the class described embodying trench mowing and trench clearing devices, and means whereby said devices may be selectively operated.

4. In a machine of the class described, a ground wheel, a relatively fixed member supported by said wheel for travel, a mower device carried by said member and including a shaft driven from said wheel, a second shaft driven from said wheel, a brush carried by the second-mentioned shaft, and means for selectively bringing said shafts into gear with said wheel.

5. In a machine of the class described, a ground wheel, a relatively fixed member supported by said wheel for travel, a mowing device supported by said member and including a cutter having its effective portion inclined downwardly with relation to the plane of the wheel when the mowing device is in working position, a conical brush carried by said member, and means whereby the mowing device and brush may be selectively brought into operative position.

6. In a machine of the class described, a ground wheel, a relatively fixed plate, a spindle fixed to the plate and rotatably supporting the ground wheel, a handle pivotally connected with the spindle and adjustably connected with the said plate, a mowing device carried by the plate, a brushing device carried by the plate, gear means for driving the mower device from the ground wheel, gear means for driving the brushing device from the ground wheel, and means whereby the said gear means may be selectively rendered active and inactive.

7. In a machine of the class described, a ground wheel, a relatively fixed plate, a spindle carried by the plate and rotatably supporting the ground wheel, a handle pivotally connected with the spindle and angularly adjustable about the same as an axis, means for connecting the handle with the plate in various positions of its angular adjustment a mower device carried by the plate, an arm pivotally connected with the spindle and angularly adjustable thereabout, means for connecting the arm with the plate in the various positions of adjustment of the former, and a ground roller carried by the arm.

8. In a machine of the class described, a ground wheel, a relatively fixed plate, a spindle upon the plate rotatably supporting the ground wheel, a mower device mounted upon the plate and driven from the ground wheel, means whereby the mower device may be angularly adjusted with relation to the plate, in a plane parallel to the plane of the plate and a handle connected with the spindle and with the said plate.

9. In a machine of the class described, a ground wheel, a relatively fixed plate, a spindle upon the plate rotatably supporting the ground wheel, a mower device mounted upon the plate and driven from the ground wheel, means whereby the mower device may be angularly adjusted with relation to the plate in a plane parallel to the plane of the plate, and a handle pivotally connected with the spindle and adjustably connected with the plate.

10. In a machine of the class described, a ground wheel, a relatively fixed plate, a spindle carried by the plate and rotatably supporting the ground wheel, the said plate being provided with a series of sockets concentric to the spindle, a mower device carried by the plate, a handle pivotally connected with the spindle, means carried by the handle and engageable in said sockets interchangeably whereby to connect the handle with the plate in various positions of adjustment of the handle, an arm pivotally connected with the spindle, means carried by the arm for engagement in the sockets interchangeably whereby to connect the arm with the plate in various positions of adjustment, and a ground roller carried by the arm.

11. In a machine of the class described, a ground wheel, a relatively fixed plate, a spindle carried by the plate and rotatably supporting the ground wheel, a mower device mounted upon the plate, a brushing device mounted upon the plate, the mower and brushing devices being driven from the ground wheel, and a handle pivotally connected with the spindle and adjustably connected with the plate.

12. In a machine of the class described, a ground wheel, a relatively fixed plate, the ground wheel being provided with a gear, a spindle carried by the plate and rotatably supporting the ground wheel, a mower device carried by the plate and including a rotary shaft extending through the plate, a pinion loosely mounted upon the shaft and meshing with the said gear and having a clutch element, a clutch member connected for rotation with the shaft and slidable into and out of position to coact with the clutch element of the pinion, a member rotatably mounted through the plate and provided at one end with means whereby it may be rotatably adjusted, the said member being threaded, and a member having threaded engagement with the said threaded member and coacting with the clutch member to shift the same when the said threaded member is rotatably adjusted.

13. In a machine of the class described, a supporting plate mounted for travel, and a mowing device mounted upon said supporting plate and including a rotary shaft extending at right angles to the plane of the support, means for rotating the shaft, blades mounted upon the shaft and having their cutting edges receding from the outer end of the shaft, and a fixed blade having its cutting edge positioned in the path of movement of the cutting edges of the first-mentioned blades.

14. In a machine of the class described, a ground wheel, a relatively fixed plate disposed beside the wheel, the said wheel having an internal gear, and a mowing device mounted upon said plate and including a shaft extending at right angles from the plane of the plate, a pinion upon the shaft meshing with the said internal gear, and blades mounted upon said shaft and having their cutting edges receding from the outer end of the shaft.

In testimony whereof I affix my signature.

JOSEPH SOPOUSEK. [L. s.]